July 20, 1965 L. E. IVINS 3,196,403
ELECTRONIC SWITCH
Filed Oct. 17, 1960 3 Sheets-Sheet 1

INVENTOR.
LAWRENCE E. IVINS
BY
Christie, Parker & Hale
ATTORNEYS.

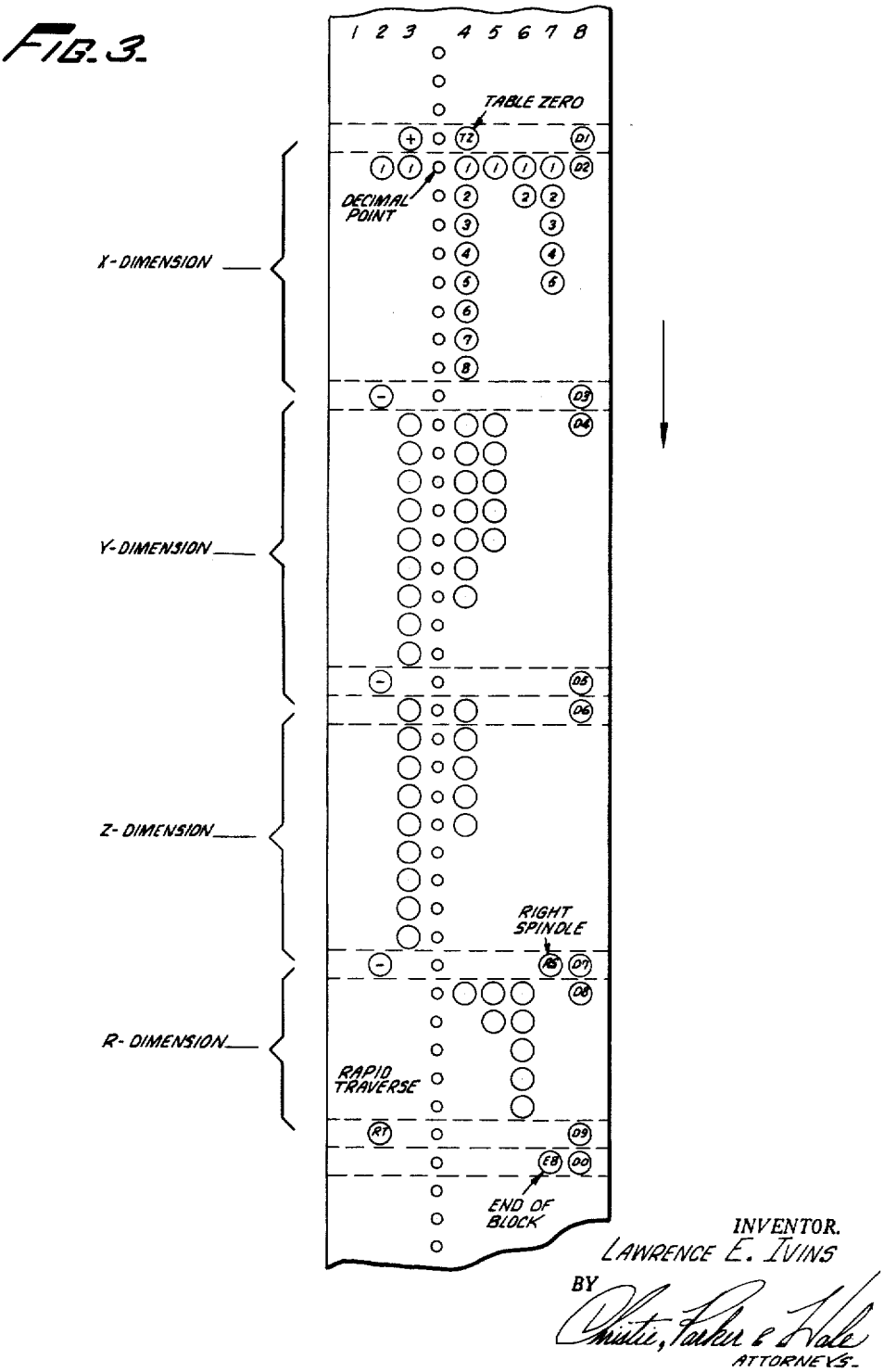

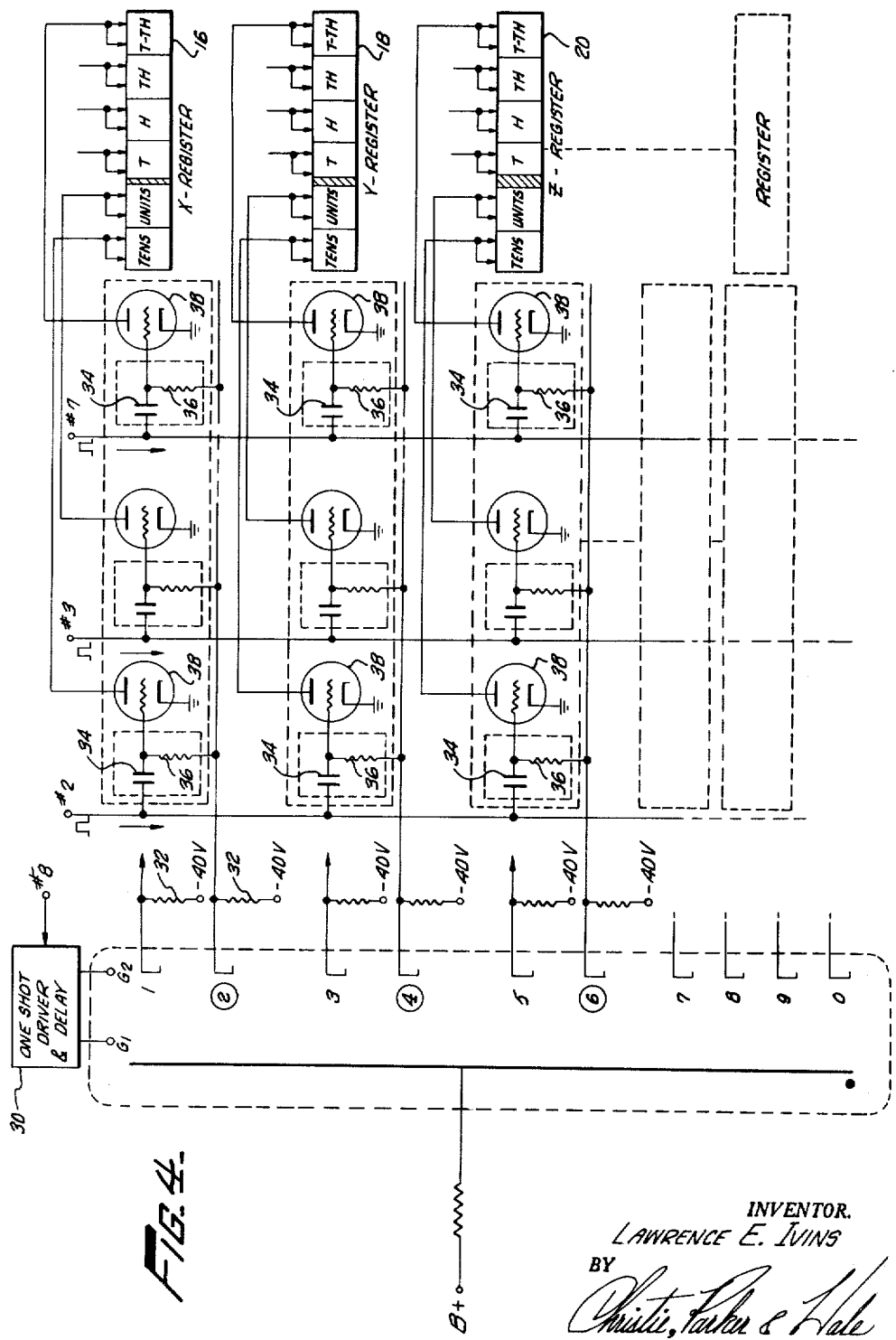

United States Patent Office 3,196,403
Patented July 20, 1965

---

3,196,403
ELECTRONIC SWITCH
Lawrence E. Ivins, Hawthorne, Calif., assignor, by mesne assignments, to Ex-Cell-O Corporation, Detroit, Mich., a corporation of Michigan
Filed Oct. 17, 1960, Ser. No. 62,986
11 Claims. (Cl. 340—172.5)

This invention relates to electronic switching circuits and, more particularly, to high speed electronic circuits for distributing information derived from storage media.

The successful application of digital techniques for computing purposes has been adapted for other digital control operations including their use in automation systems, the control of machine tools and the like. The digital techniques as applied to the control of machine tools have been termed numerical control. Numerical control begins with a command to move a machine member to a new location to start or stop some machine operation such as the flow of a coolant, to select a cutter speed, and similar operations. All such commands can be digitally expressed as digital signals coded in terms of a number system. Machining operations are governed by mechanical drawings of the parts to be machined and which drawings are dimensioned in terms of the decimal system. Accordingly, the most popular codes for numerical control are the binary coded decimal and the decimal system. These command numbers are stored on a medium such as punched paper tape, cards, magnetic media, or the like, and are read into the numerical control system when a machine operation is to be initiated. An important aspect of the reading of the information from the storage medium into the numerical control circuit is the distribution of the stored information including the dimensional information to the proper storage registers or control circuits so as to cause them to command the machine members with the correct information when the digital control circuit is placed into operation. Heretofore, the distribution of this coded information has been effected by electro-mechanical means such as a conventional stepping switch. In some instances, it has been found necessary to read the information from the storage media into a buffer storage prior to distribution to the proper registers. This method of operation not only increases the reading time but requires additional equipment and thereby expense. In addition, electro-mechanical switching means have been found to be inherently slow and present the usual problems with regard to contact life, bulkiness, expense, and the like. It is, therefore, desirable to provide an electronic switching circuit to operate to directly distribute the information derived from the storage media to the correct registers at high speeds and yet be inexpensive and have a relatively long life.

This invention provides an improved electronic distributor or switch for directly distributing information from a storage media such as a paper tape at relatively high speeds and which is relatively inexpensive. Broadly, the input control system, as it may be applied for the numerical control of a machine tool, includes a record member having information marks including a register identifying mark recorded thereon. The register identifying marks are located on the record medium adjacent the dimensional information or control information so as to indicate or address the corresponding information to the correct register in the numerical control system. Upon the production of relative movement between the storage medium and the sensing means therefor, electrical indications corresponding to the recorded information marks are produced. The electronic distributor is connected to be responsive to the electrical indications corresponding to these information marks and, in direct response to the register identifying marks, distributes them to the correct registers.

In a specific embodiment of the invention, the record member takes the form of an elongated tape in which the information marks are recorded in terms of perforations arranged in rows and columns. The columns are arranged to represent different decimal orders to record the decimal information and similar coding techniques are employed for commanding the machine operations and the auxiliary machine functions. The decimal digits of each decimal order are recorded in a single column by a plurality of successive perforations corresponding to the decimal digit. The register identifying perforation is arranged in the first row of each information group for identifying the storage register to which the dimensional information or the like is to be distributed. The perforated tape is arranged with a sensing means whereby the sensing elements thereof are arranged in alignment with the rows of the perforations to provide the electrical indications corresponding to the sensed perforations in a parallel circuit relationship. The storage register identifying signal is delivered to an electronic stepping switch of the distributor to place the switch in one of its multiple states directly corresponding to the sensed perforation. In the particular embodiment disclosed, the electronic stepping switch traverses between its multiple states in a sequential fashion and, accordingly, the storage register identifying marks are arranged in the same sequential fashion on the record member. The electronic distributor further includes a register control circuit arranged between the electronic stepping switch and each register. Each register control circuit is connected to be responsive to a separate one of the output circuits of the electronic stepping switch in combination with the electrical information indications provided by said sensing means. The register control circuits each include a separate gating circuit corresponding to each column of the perforated tape having an information mark recorded therein. In this fashion then the information signals from each column of the paper tape are delivered in parallel to each gating circuit for each register control circuit. The register control circuits, then, distribute this information in response to a preselected state of the electronic stepping switch whereby only one register control is activated to pass the electrical indications from the tape into the correct registers.

These and other features of the present invention may be more fully appreciated when considered in the light of the following specification and drawings, in which:

FIG. 3 is a fragmentary view of a typical tape prepared for controlling a machine tool;

FIG. 4 is a partial, schematic representation of the electronic distributor of FIG. 1 and embodying the invention.

The invention is best described as embodied in an input system for the control of a machine tool. The tape format and the registers are applicable for the control of any machine tool, although references will be made hereinafter to the control of a specific machine tool, namely a boring machine.

Figure 1:
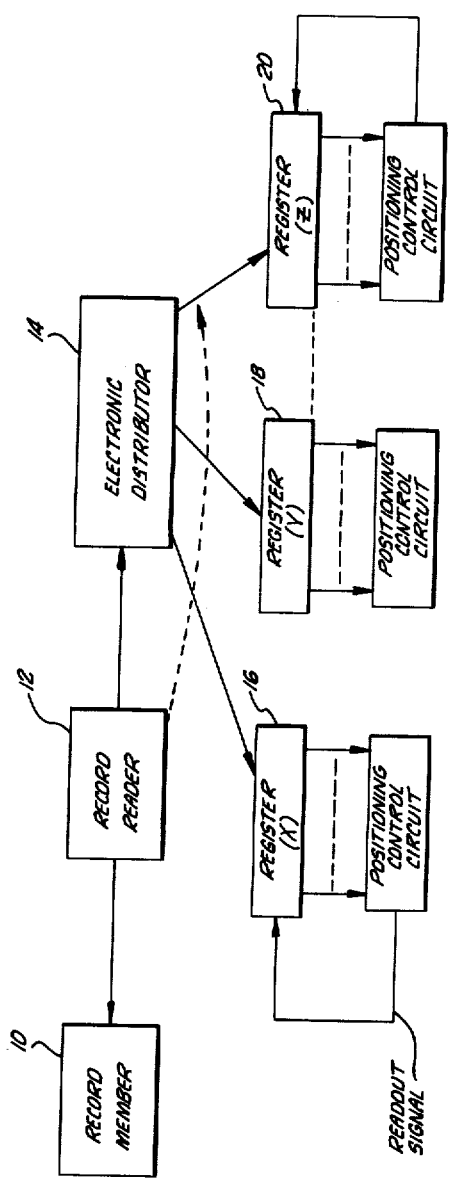
FIG. 1 is a block diagram of the electronic switching arrangement embodying the invention.

The generalized system of FIG. 1 includes the storage media or record member 10 having the numerical commands recorded thereon arranged with a record reader 12 to provide the electrical indications corresponding to the recorded numerical commands. These electrical indications are delivered to an electronic distributor 14 which functions to directly distribute each group of information to its correct utilization circuit or register. The stored information on the record member may comprise merely the positioning commands for three axes, such as X, Y, and Z axes, and, when read, are stored in the corresponding registers 16, 18, and 20. After the record member has been sensed and all the information has been distributed to the correct registers, then the machine proper is commanded by the numerical control system and the various elements or operations are performed in response to the numerical commands that have been distributed and recorded in the appropriate registers or circuits.

Figure 2:
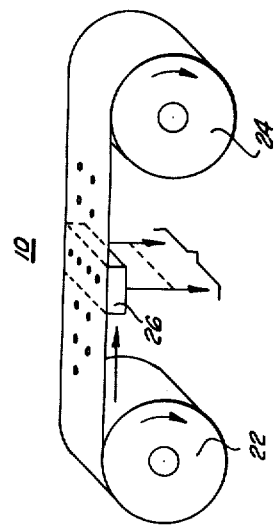
FIG. 2 is a schematic representation of a record member and reader for use in the system of FIG. 1.

The record member 10 is diagrammatically illustrated in FIG. 2 as comprising a paper storage media having information marks recorded thereon in terms of perforations, the paper tape being arranged in the conventional fashion and driven from a supply reel 22 to a take-up reel 24. A sensing means 26 is arranged transverse of the paper tape to cause the reading of the perforations and provide the electrical indications corresponding thereto. The sensing means 26 reads the paper tape row by row as the tape is advanced thereby and provides the electrical indications to the electronic distributor 14 in a parallel fashion.

An examination of the portion of the paper tape shown in FIG. 3, particularly the format therefor, is now necessary prior to a more detailed examination of the electronic distributing arrangement 14. The paper tape is shown as prepared for use in a double-ended boring machine having four dimensions recorded thereon in addition to the auxiliary functions. In addition to the usual X, Y, and Z dimensions, the boring radius is also commanded from the tape. The dimensions are coded in terms of the decimal code and six columns are used for this purpose. The columns two through seven, reading from left to right, are coded to represent the decimal digits $10^1$, $10^0$, $10^{-1}$, $10^{-2}$, $10^{-3}$, $10^{-4}$, or, stated differently, to represent the tens, units, tenths, hundredths thousandths, and ten-thousandths. As will be evident hereafter, these columns are employed for other commands. The first column of the tape is not used and, therefore, no control perforations are recorded therein. The remaining column eight, is utilized only for storage register identifying purposes. The usual longitudinal row of sprocket holes arranged between columns three and four serves as a decimal point for the dimensional information recorded on the tape.

For the purposes of disclosing this invention, only the recorded dimensional information will be considered in order to simplify the description thereof. To this end, the first group of dimensional information includes the row of perforations having the perforation identified as D2 in column eight. It will be noted that each of the columns two through seven have a perforation and that columns four, six, and seven have perforations in the rows succeeding the said first row. This first group of perforations may represent a number such as the X dimension for the table movement, which in the illustrated tape is 11.8125 inches from the zero reference position. A close examination of this group of perforations will indicate that this number is correctly recorded in the decimal system by counting the number of successive perforations in each column and comparing it with the desired number or dimension. To this end, columns two and three have a single perforation in the first row and since these columns appear to the left of the sprocket holes or decimal point, they represent the number 11. To the right of the decimal point, beginning with column four, it is noted that eight successive perforations are recorded therein to represent the decimal digit eight for the tenths position, while in column five in the hundredths position a single perforation occurs, and, in the same fashion, two and five perforations occur in columns six and seven to represent the decimal digits two and five respectively.

It should be noted that this tape format may be conveniently checked by the machine operator without requiring any training or experience since he already has been trained to read the mechanical drawings or blueprints which are in terms of decimal dimensions and he can compare the blueprint dimensions with the coded perforations to check their accuracy by merely counting the perforations in each column and comparing them with the blueprint dimensions. The sprocket holes serve as a convenient decimal point for this purpose.

Now, further considering the information recorded in column eight, it will be noted that the perforations in this column are identified in sequential fashion as D1, D2 . . . D9, D0. Each of these symbols correspond to a single state of the electronic stepping switch for controlling the placement of the recorded information into the correct register. For example, the electrical signals for the X dimension, are to be recorded in the register that is activated when the electronic stepping switch is placed in a state corresponding to the register identifying mark D2. In the same fashion, it will be noted that each information group on the tape includes a similar register identification mark in column eight in the first row for each new information group.

The electronic distributor 14, in one of its practical forms, includes a beam switching tube that is commercially identified as a Dekatron switching tube. The Dekatron is schematically represented in FIG. 4, at the left-hand portion thereof. The Dekatron tube includes a plurality of cathodes, in this instance, ten, and a single anode arranged in the same envelope with a pair of guide electrodes identified as G1 and G2. The Dekatron is a gaseous discharge tube and may be designed bidirectional or unidirectional in accordance with the application thereof. The switching of the beam that is formed between the anode and one of the various cathodes is under the control of the guide electrodes G1 and G2. The sequence of the pulsing of the guide electrodes G1 and G2 controls the direction of the switching of the beam from cathode to cathode. When the pulsing sequence is G1–G2, the beam will switch from cathode one to cathode two to cathode three, or from the top to the bottom of the tube, as shown in FIG. 4. The reverse sequence of pulsing, namely G2–G1, will cause the tube to count down, or from cathode zero, nine, eight, et cetera. The beam switching tube for use as the electronic stepping switch is most easily discussed as having a unidirectional switching action. The pulsing of the guide electrodes G1 and G2 is accomplished by means of a conventional one-shot driver circuit 30 which includes a delay arrangement whereby a triggering pulse delivered to the circuit 30 is shaped to form a pair of pulses for the guide electrodes in the desired sequence, G1 and G2, in a delayed relationship.

The construction and operation of this commercially available Dekatron tube is well-known in the art and attention is merely directed to the use of the guide electrodes G1 and G2 along with the one-shot driver 30 as the input circuit for this electronic stepping switch. The various cathodes, identified as one through zero reading from the top to the bottom, are utilized as output circuits for the tube and are each representative of a different stable state thereof whereby a different output pattern is generated in response to each triggering pulse delivered to the input circuit. Suffice it to say for the purposes of this invention that each cathode includes a dropping resistor similar to the register 32 connected thereto and to a source of negative potential. The output terminal from each cathode is connected to the positive terminal of the resistors 32 and the output potential or conductive condition of this output terminal will be dependent upon whether the beam is formed on a particular cathode or one of the other cathodes. Specifically, if the beam is formed between the anode and the cathode number one, the output terminal from cathode number one will have an output potential of zero volts, while the remaining cathodes two through zero will each have a different conductive condition, or minus 40 volts. As pulses are delivered to the one-shot driver 30, the beam is successively switched from cathode to cathode and, accordingly, only one of the cathodes will be in a different conductive condition than the remaining cathodes.

The control potential afforded by the electronic beam impinging on one of the cathodes of the electron beam switching tube is utilized for controlling a gating network of the well known pulse level type. The particular pulse gating network shown in FIG. 4 comprises a capacitor 34 and a resistor 36 coupled to the grid of a triode amplifying tube 38. The resistor 36 is shown having one end coupled to the grid of the triode 38 and its opposite end directly connected to cathode two of the Dekatron switching tube. The capacitor 34 is diagrammatically represented as being coupled to the sensing element arranged for sensing the perforations in column two of the record member or paper tape 10. The positive pulses delivered to the capacitor 34 by a sensing element when it senses a perforation in column two are of such a level (approximately 20 volts) so as to be inhibited by the negative potential assumed by a cathode of the electronic stepping switch when the beam does not impinge thereon. Stated differently, the negative potential of the cathode inhibits the arrival of the pulse at triode 38. However, when the electron beam exists between the anode and cathode number two, the cathode assumes a more positive potential, or zero volts, and, therefore, the positive pulse delivered from column two is not inhibited but is coupled to the grid of the triode 38 and appears at its output circuit. This combination of the states of the Dekatron switching tube and the pulse level gating circuit controls the application of the electrical indications derived from the paper tape to the correct registers.

Referring more specifically to FIG. 4, the remaining elements for effecting the electronic distribution and control will be described. The registers 16, 18, and 20 are shown therein in block form as comprising a plurality of stages. The number of decimal stages for these registers correspond to the number of decimal digits recorded for the X, Y, and Z dimensions on the tape of FIG. 3. To this end, six independent stages are shown for the X, Y, and Z registers 16, 18, and 20 while five are generally sufficient for the Y and Z registers 18 and 20 respectively. The solid line between the units and tens stages for each of these registers merely corresponds to the decimal point therefor. Each of the registers 16–20 include a register control circuit for controlling the entry of information therein.

To simplify the schematic representation and the description of the electronic distributor 14, the register control circuits are shown only for cathodes two, four, and six, in FIG. 4. These cathodes correspond to the register identifying marks D2, D4, and D6 of FIG. 3 to distribute the dimensional information for the X, Y, and Z dimensions into their corresponding registers 16, 18, and 20. Each cathode of the electronic stepping switch is connected in parallel circuit fashion to a separate pulse level gating circuit arranged in each register control circuit. A gating circuit is provided in each register control circuit corresponding to the number of columns having information marks therein. For example, in the control register for the X register 16, six such gating circuits are arranged with each resistor 36 therefor coupled in a parallel fashion to cathode number two. To simplify the illustration, only the gating circuits for columns 2, 3, and 7 are shown. The register control circuit for register 18 includes five gating circuits with one of the inputs of these gating circuits each coupled in parallel to cathode number four. In the same fashion, cathode number six controls each of the five gating circuits for the register control circuit of register 20. The pulses provided from sensing the perforations in each column are coupled in a parallel fashion to each capacitor 34 whereby each capacitor individual to a particular column will receive the pulses in parallel. To this end, the pulses from column 2 will be delivered to the left-hand gating circuit for each of the register control arrangements for registers 16, 18, and 20. The pulses derived from columns three through seven are similarly arranged. The electrical indications corresponding to the sensed perforations in column eight are delivered to the one-shot driver and delay circuit 30 for controlling the state of the electron stepping switch.

With the above structure in mind, the operation of the electronic distributor 14 will be more fully described. The description to follow will assume the tape has been placed into motion whereby the perforations corresponding to row D2 are presented to the sensing elements. The D2 electrical indication from column eight will be coupled to the one-shot driver and delay circuit 30 whereby the guide electrodes G1 and G2 will be pulsed in that order. This will cause the electron beam to form between the anode and cathode number two of the stepping switch. Therefore, cathode number two will have a different output level than the remaining cathodes, namely zero volts. Immediately after the beam has switched to cathode number two, the pulses corresponding to the perforations in columns two through seven are delivered to the respective gating circuits of each of the register control circuits. Since cathode number two is the only cathode at a zero level, these pulses will be coupled through the gating circuit and the corresponding triode 38 in a parallel fashion to the individual stages of the X register 16. During this same interval, cathodes four and six (and the remaining cathodes) are at a negative potential and inhibit these same pulses through their respective gating circuits and thereby are not delivered to the corresponding stages of the registers 18 and 20. At this moment, then, the stages of the X register 16 record the decimal digit 1 1 1 1 1 1, reading from left to right, and the Y and Z registers 18 and 20 will both read zero throughout. As the tape is advanced to the next succeeding row, it will be noted that no perforation appears in column eight and, accordingly, the electron beam will maintain its position between the anode and cathode number two and thereby maintain the gating circuits for the X register control activated. The decimal information pulses are then delivered to the X register 16 in accordance with the perforations sensed in columns four, six, and seven whereby the X register, subsequently thereto, will read 1 1 2 1 2 2, reading from left to right, and the Y and Z registers will still read zero throughout. In the same fashion, the pulses are sequentially developed row by row and delivered to the correct stages of the X register 16 until it is counted up to read the correct recorded X number or dimension 11.8125.

Omitting the next group of information, identified by the register identifying mark D3 and skipping to the group having the register identifying mark D4, and which group is representative of Y number or dimension 9.7500, the description of the circuit operation will proceed. As the sensing element reads the mark D4, the beam of the switching tube will be transferred sequentially from cathode number three onto cathode number four. With the beam at cathode number four, only the control circuit for register 18 will have its gating circuits activated and, thereby, the pulses provided by the sensing elements will be recorded only in register 18. The X register 16 will maintain its recorded information, while the Z register 20 will still read zero in each stage. After the beam has switched to cathode number four, the information from this same row is entered into the Y register 18 and the register is sequentially counted up until it reads the correct Y dimension. In the same fashion, the electron stepping switch will be switched from cathode number four to cathodes five, six, et cetera, and thereby control the distribution of the corresponding groups of information recorded on the paper tape.

It should be noted that although the above description has been limited to the recording of decimal information into the registers 16, 18, and 20, that any information that may be recorded on the record member 10 may be similarly distributed and that the registers need not be decimal registers but may take any form such as a relay circuit, magnetic core circuits, or any other well known circuit. To this end, reference may be had to FIG. 3, wherein the register identifying marks D1, D3, D5, et cetera, identify an auxiliary machine function such as direction and feed rate, the spindle of the boring machine to be used and the like.

Figure 5:
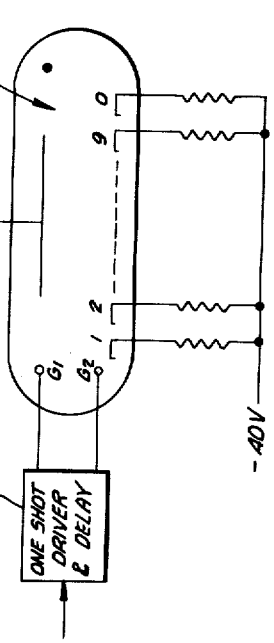
FIG. 5 is a schematic representation of a typical counting circuit for use as a register in FIGS. 1 and 4.

At this point it should be noted that the various stages of each of these registers 16, 18, and 20 may comprise a Dekatron switching tube of the type utilized for the electronic stepping switch and the associated one-shot driver circuit 30 would be employed therewith. To this end, the Dekatron switching tubes employed in the registers 16–20 are preferably arranged as bidirectional switching elements and a typical element for each decimal stage is shown in FIG. 5. The beam switching tubes employed in the registers would be counted up when information is to be recorded therein and subsequently counted down when the machine elements are to be positioned.

It should now be recognized by those skilled in the art that the electronic stepping switch portion of the electronic distributor may take the form of an electronic counting tube. The counting tube or circuit is sequentially stepped or counted up in accordance with conventional counting operations but is used in this invention not as a counter but as controlling circuit to distribute information. To this end, the registers employing counting circuits are also utilized for other purposes than counting, namely, the storage of information which may later be interrogated by the numerical control arrangement to provide the correct commands.

It is therefore evident that this invention has advanced the state of the art by providing a high speed electronic distributor for controlling the distribution of electrical information derived from a record member or storage media into the correct registers. An electronic distributor of the type disclosed has been operated successfully in a numerical control system wherein a block of information as shown in FIG. 3 may be read and distributed in approximately one-tenth of a second

What is claimed is:

1. In a control system including a record member having rows of information marks arranged in preselected groups in a fixed order including a register identifying mark for each group recorded thereon, each register identifying mark being the same and recorded at the same location for each group of marks, means for sensing the record member and providing an electrical indication corresponding to each recorded mark upon the production of relative movement between said record member and said sensing means, means for continuously producing relative movement between said record member and said sensing means, a plurality of registers, one register for each group of information recorded on said member, and an electronic distributor connected to be responsive to the electrical indications corresponding to the information marks of each row and to directly distribute all of the information marks of a group as received from the sensing means only to the register corresponding to the register identifying mark for the group and to be switchably responsive to each register identifying mark for distributing the groups to the correct register in accordance with the fixed order of information groups.

2. In a control arrangement having a storage media with groups of information recorded thereon in a preselected number of rows and a register identifying mark accompanying each information group, means for sequentially and continuously reading each row of the storage media including the register identifying mark in a parallel fashion to provide electrical signals corresponding to the stored marks, an electronic counting circuit having a plurality of output circuits and an input circuit connected to be responsive only to the electrical signals corresponding to the register identifying marks whereby the output circuits assume a different output pattern in response to each register identifying mark, a plurality of registers for receiving and storing the electrical signals corresponding to the information groups, one register for each information group, and a register control circuit individual to each register connected in parallel circuit relationship to said reading means to be directly responsive to the electrical signals of each row corresponding to each information group in coincidence with a unique output pattern of the counting circuit whereby each information group is delivered to the correct register.

3. In an input system for a numerical control arrangement including a record member having information blocks recorded thereon in a fixed order by means of marks in preselected rows and columns, the recorded information including a register identifying mark in the first row of each information block and binary coded decimal information in each information block, means for continuously sensing the record member row by row and providing an electrical signal corresponding to each recorded mark in a column, an electronic circuit having a single input circuit connected to be responsive to the electrical signals derived from said register identifying marks and a plurality of output circuits corresponding in number to at least the number of recorded information blocks, said circuit providing a unique state at one of said output circuits in response to each sensed register identifying mark, a separate information register having a plurality of stages for each information group connected to receive the sensed information derived from each row in parallel circuit relationship, and a separate gating circuit for each stage of each register connected to be responsive to each signal from an individual column of the record member row by row in coincidence with the unique state of an individual output circuit of said circuit whereby each information group is sequentially delivered to the correct register in accordance with the fixed order.

4. In an output system for a numerical control arrangement as defined in claim 3 wherein the recorded information includes decimally recorded information and each decimal digit is represented by a series of marks corresponding to the digit and the registers for receiving the decimal digits comprise decimal counting circuits.

5. In a control system including a record member having information marks including a register identifying mark recorded thereon in columnar fashion in a fixed order, the register identifying mark separating the information marks into information groups, means for sensing the record member and providing an electrical indication corresponding to each recorded mark, an electronic switching circuit having a plurality of switching states and switchable between the states in a preselected sequence in response to the electrical indication corresponding to each of the register identifying marks, said electronic switching circuit having an output circuit corresponding to each switching state switchable between two conductive conditions and arranged whereby only one of the output circuits is in a different conductive condition from the remaining output circuits, a plurality of storage registers, one register for each information group, a register control circuit for each register, said register control circuits including a separate gating circuit corresponding to each column having an information mark recorded therein coupled to the sensing means for each column, each register control circuit being connected to be responsive to a separate one of said output circuits in combination with the electrical indications provided by said sensing means to deliver said indications to its corresponding register only when the separate output circuit is in said different conductive condition.

6. A control arrangement including a record member having information blocks recorded thereon in terms of marks in columns, the information blocks being arranged in a fixed order and including decimally recorded dimensional information whereby preselected columns represent different decimal orders, the decimal digits for each order being recorded by a plurality of successive marks corresponding to the decimal digit, the record member including a mark arranged in the first row of each block for identifying a storage register to receive each block of information, means for sensing the marks in each column row by row and to provide a separate electrical signal corresponding to each mark in a row, means for producing relative movement between said record member and said sensing means, a plurality of registers for receiving the information recorded in each block, each of said registers receiving the decimal information having a number of stages correspoding to the number of decimal orders for each dimension whereby the electrical signals for each decimal order are entered into a register in parallel, an electronic distributing switch having a plurality of output stages and a single input stage, said input stage being connected to be responsive to the storage register identifying mark to sequentially step the switch between output stages, and a plurality of gating circuits for each register connected to be responsive to an individual columnar electrical signal provided by said sensing means and one of said output stages whereby the information blocks are distributed to a register having its gating circuits coupled to the output stage of the electronic distributor corresponding to the received storage register identifying signal.

7. A control arrangement for a numerical control system including a record member having variable length information blocks recorded thereon in terms of perforations in columns and in a fixed order, the information including decimally recorded dimensional information whereby preselected columns represent different decimal orders, the decimal digits for each order being recorded by a plurality of successive perforations corresponding to the decimal digit, the record member having a perforation arranged in the first row of each block for identifying a storage register to receive each block of information, means for sensing the perforations in each column row by row and to provide a separate electrical signal corresponding to each perforation in a row, means for producing relative movement between said record member and said sensing means, a plurality of registers for receiving the information recorded in each block, each of the registers for receiving the decimal information having a number of stages corresponding to the number of decimal orders for each recorded dimension whereby the electrical signals for each decimal order are entered into said registers in parallel, a beam switching tube having an electron beam switchable between a plurality of output stages and a single input stage, the beam being responsive to successive input pulses delivered to said input stage to sequentially switch the beam between output stages, said input stage being connected to be responsive to the electrical indication corresponding to the storage register identifying mark to step the beam switching tube between the output stages, and individual gating circuits coupled to each storage register each having two input circuits and a single output circuit, the gating circuits for the registers storing the dimensional information comprising a separate gating circuit corresponding to the number of decimal orders for each individual register, each of the output stages of said beam tube is connected to each of the input circuits of the gating circuits for the individual register corresponding to the register identifying mark, the other input circuits for each gating circuit being connected to receive the electrical indications from the sensing means corresponding to a separate one of the columns whereby the coincidental placement of the beam of said beam tube at one of the output stages connected to the gating circuits for an individual register produces an output indication therefrom corresponding to the sensed perforation and causes the other gating circuits to be inhibited whereby the electrical indications from the sensing means is stored in the individual registers in response to the register identifying marks in accordance with the fixed order of the information blocks.

8. A control arrangement for a numerical control system as defined in claim 7 wherein the registers for receiving the decimal information comprise decimal counting tubes and the gating circuits are pulse level gating circuits.

9. A control member for use in digital control apparatus comprising a record member adapted to have information marks recorded thereon in rows and columns, the information marks being transversely aligned in the rows and longitudinally aligned in the columns of the record member with a preselected number of rows comprising a single piece of information, the pieces of information being successively recorded on the record member in a preselected order, the first row of each group of information having at least a single register identifying mark recorded in a preselected column of the record member for separating the pieces of information from one another and to provide a register entry signal when read for causing the remaining information marks to be distributed when read into a preselected register until the next successive of said register identifying marks is read, each of said register identifying marks being the same and recorded in the same preselected location.

10. A control member for use in digital control apparatus comprising a record member adapted to have information marks recorded thereon in rows and columns, the information marks being transversely aligned in the rows and longitudinally aligned in the columns of the record member with a preselected number of rows comprising a single piece of information, the pieces of information being successively recorded on the record member in a preselected fixed order without skipping any rows, the first row of each group of information having at least a single non-unique register identifying mark recorded in the same preselected column of the record member for separating the pieces of information from one another and to provide a register entry signal when sensed for causing the remaining sensed information marks to be distributed into a preselected register until the next successive of said register identifying marks is sensed.

11. A control member for a numerically controlled machine tool for recording the numerical information necessary for relatively positioning a work piece and the machine cutting tool in terms of coordinates defined by decimal digits, the numerical control apparatus for the machine tool including separate registers for receiving the electrical indications representing decimal digits defining the corresponding coordinate, said control member comprising a record element adapted to have numerical information marks recorded thereon in rows and columns, said information marks being transversely aligned in the rows and longitudinally aligned in the columns of the record member with a preselected number of rows comprising a single piece of numerical information, the pieces of information being arranged in a preselected order, the first row of each group of information having at least a single, non-unique register identifying mark recorded in the same preselected column of the record member for separating the pieces of information from one another and to provide a register entry signal when read for causing the remaining information marks to be distributed to the corresponding register when read until the next successive of said register identifying marks is read, a piece of information representing a coordinate having the different decimal orders represented by different columns on the record member and with each decimal digit for each decimal order being recorded in terms of a number of information marks in successive rows corresponding to the decimal digit for that order and co-ordinate.

References Cited by the Examiner
UNITED STATES PATENTS

| | | | |
|---|---|---|---|
| 2,302,025 | 11/42 | Gould | 235—61.6 |
| 2,624,786 | 1/53 | Potter. | |
| 2,710,934 | 6/55 | Senn | 318—162 |
| 2,833,941 | 5/58 | Rosenburg et al. | 307—149 |
| 2,881,415 | 4/59 | Dumousseau et al. | 340—172.5 |
| 2,886,797 | 5/59 | Gardberg | 340—166 |
| 2,922,940 | 1/60 | Mergler | 340—347 X |
| 2,932,688 | 4/60 | Wright et al. | 340—172.5 X |
| 2,943,788 | 7/60 | Hearsum et al. | 340—172.53 |
| 2,945,221 | 7/60 | Hinton et al. | 340—172.53 X |
| 3,007,140 | 10/61 | Minnick et al. | 340—172.5 |
| 3,033,447 | 5/62 | Buegler | 340—172.5 |
| 3,061,192 | 10/62 | Terzian | 340—172.5 |

ROBERT C. BAILEY, *Primary Examiner.*

STEPHEN W. CAPELLI, MALCOLM A. MORRISON,
*Examiners.*